Dec. 30, 1952 W. B. RETZ 2,623,267
STOCK FEED MEANS
Filed June 29, 1950 2 SHEETS—SHEET 1

Inventor
WILLIAM B. RETZ
By Mitchell Bechert
Attorneys

Dec. 30, 1952  W. B. RETZ  2,623,267
STOCK FEED MEANS
Filed June 29, 1950  2 SHEETS—SHEET 2
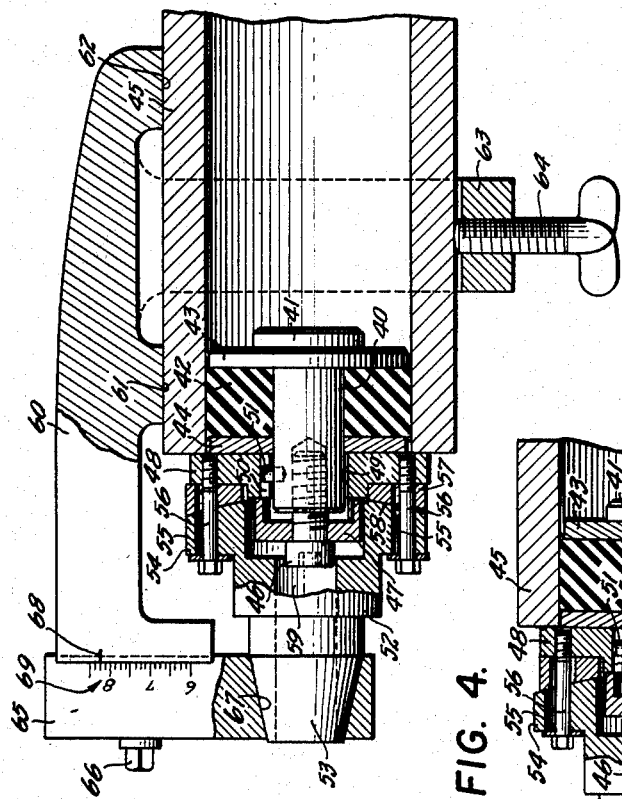
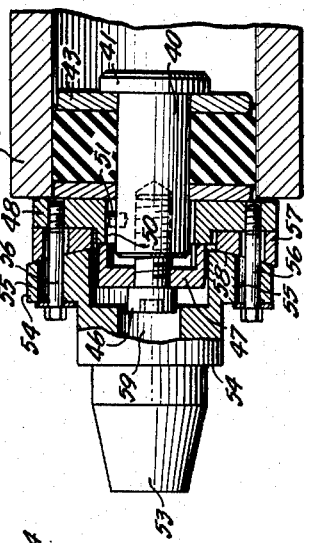
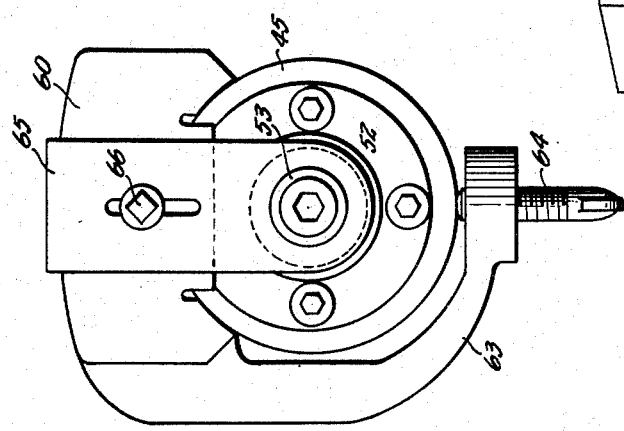
Inventor
WILLIAM B. RETZ
By Mitchell Bechert
Attorneys Patented Dec. 30, 1952

2,623,267

UNITED STATES PATENT OFFICE 2,623,267

STOCK FEED MEANS

William B. Retz, Plainville, Conn., assignor to The New Britain Machine Company, New Britain, Conn., a corporation of Connecticut Application June 29, 1950, Serial No. 171,137

6 Claims. (Cl. 29—61)

My invention relates to stock-feeding means for a bar machine or the like, and in particular to an improved means for gripping a stock pusher to the stock. My invention is in the nature of an improvement over the construction disclosed in the copending application of Clarence D. Pulsifer, Serial No. 34,108, filed June 19, 1948.

It is an object of the invention to provide an improved device of the character indicated.

It is another object to provide an improved means for chucking a stock-feeding head to a piece of stock.

It is a specific object to provide a means for eccentrically adjustably chucking a stock-feeding head to a piece of stock.

It is also a specific object to provide an improved adapter means for use with a stock-feeding chuck whereby eccentricity in the establishment of the chucking grip upon a piece of stock may be effectively nullified when the adapter means is secured to a stock-pusher head.

Other objects and various further features of novelty and invention will be pointed out or will occur to those skilled in the art from a reading of the following specification in conjunction with the accompanying drawings. In said drawings, which show, for illustrative purposes only, preferred forms of the invention:

Fig. 1 is a partly broken-away longitudinal sectional view of a stock-pushing head and of a stock-gripping or chucking mechanism incorporating features of the invention, the stock-pushing head being projected into the spindle of a bar machine or the like;

Fig. 2 is a longitudinal sectional view of a modified stock-gripping or chucking mechanism, shown applied to a piece of stock and in use with an alignment device;

Fig. 3 is a left-end view of the assembly of Fig. 2; and

Fig. 4 is a longitudinal sectional view of certain of the parts of Fig. 2, shown in a slightly different relationship.

Figure 1:
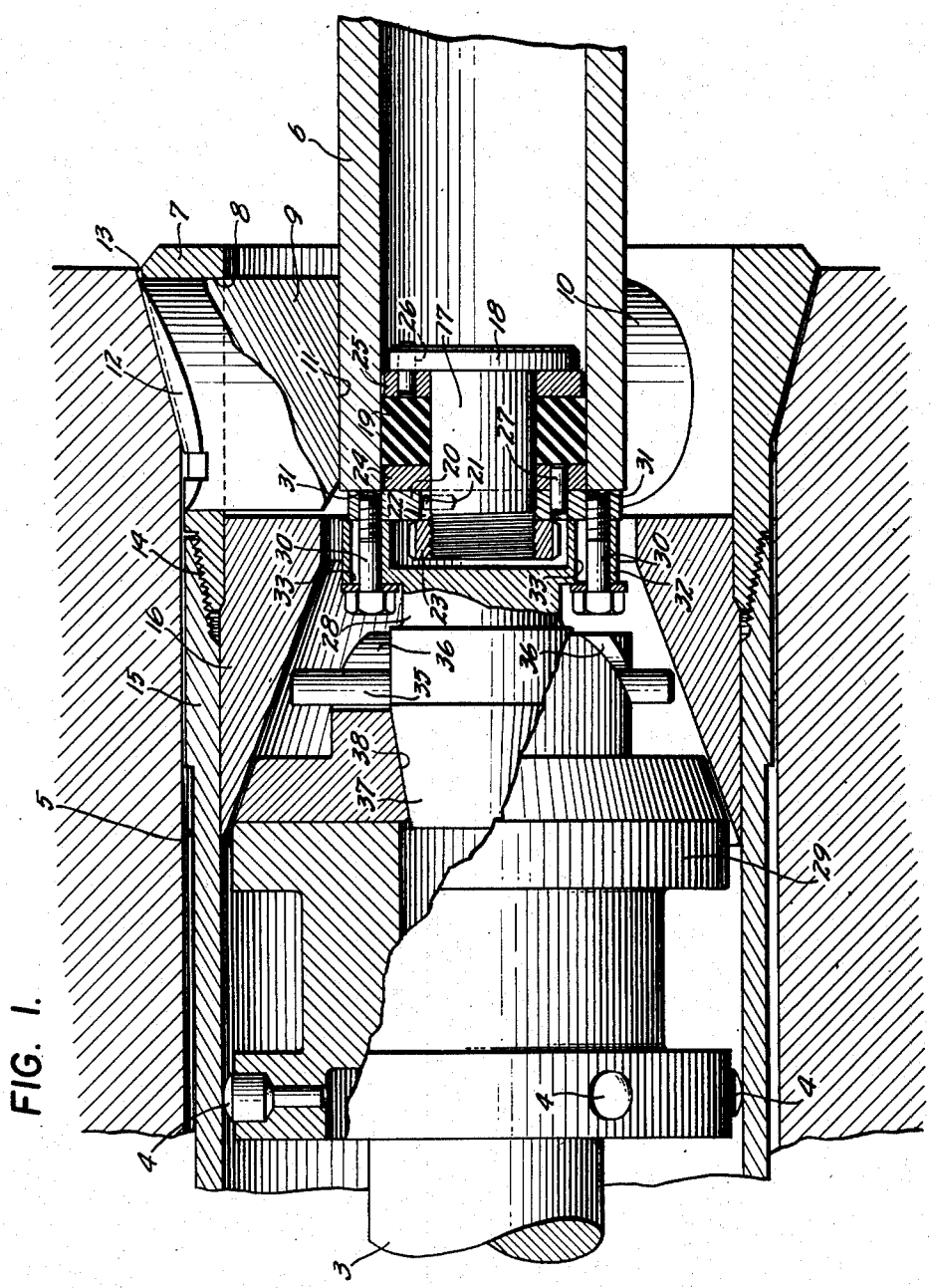

Briefly stated, my invention contemplates an improved chucking means for chucking a piece of stock to a pusher mechanism, which may form part of an intermittently operated stock-feeding means. Often, and in particular when chucking heavy stock to a stock-feeding pusher mechanism, there may be a slightly eccentric mounting or supporting of a tail end of the stock, or the pusher may be chucked in an axially misaligned relation with the stock; in order to reduce undesirable effects of such an eccentric mounting, particularly when the stock is to be rotated at high speed, I provide eccentrically adjustable securing means between the chucking means and the pusher mechanism. In the preferred forms to be described, eccentrically adjustable securing means is applied to a chucking means establishing an axially secure engagement with the stock, so that, when the feed of the pusher is arrested, the feed of the stock will likewise be arrested and so that there will therefore be no overshooting feed of stock beyond the desired feed-out position; the construction thus lends itself to machines in which it may be desired to avoid the use of a stock stop.

In one form to be described, provision is made for purely eccentric adjustment of the pusher relatively to the stock, and in the other form to be described compensation may be made for both eccentric and axial misalignments.

Referring to Fig. 1 of the drawing, my invention is shown in application to a pusher 3 having a chuck-supporting head with guide pins or studs 4 to be slidably guided in the base of the rotatable spindle 5 of a bar machine or the like. The stock 6 to be operated upon may be tubular and may be chucked or clamped at the forward end of the spindle 5 by means of a so-called drawback-type collet. The collet may include a holder member 7 generally radially bored, as at 8, at a plurality of angularly spaced positions for the slidable generally radially aligned accommodation of a corresponding plurality of collet jaws 9—10. Each of the jaws 9—10 may be generally cylindrical and formed with a work-gripping surface 11 and with a tapering collet-seat-engaging surface 12 to coact with the outwardly flaring conical collet seat 13 of the spindle 5. For actuating purposes, the holder member 7 may be threaded, as at 14, to a drawback tube 15 extending rearwardly within the spindle 5, as for actuation by the drawback cam (not shown) forming part of an automatic mechanism. The work 6 to be accommodated by the collet may be of a substantially smaller diameter than the internal diameter of the collet tube 15 and holder 7, and in such event flared or tapering adapter means 16 may be seated in the respective bores of members 15—7 so that, upon feed-out of a new piece of stock into the collet, the forward edge of the stock may be raised to a central position by means of the adapter 16 for properly aligned entrance into the jaws 9—10.

In intermittent stock-feeding mechanisms of the character indicated wherein it is desired to avoid the use of a stock stop by arresting the feed of the stock by way of the pusher mechanism, it is desirable axially firmly to grip the stock to the pusher. For such purposes, I have disclosed expansible chucking means in the above-mentioned copending patent application, and in the present case I have illustrated a similar type of chucking means. The chucking means may thus include a longitudinally extending cylindrical mandrel 17 with an integral flange 18 at one end, which may be the forward end, as shown. An annular ring 19 of resilient material may ride the mandrel 17 and in an unstressed state may be of an external diameter barely to clear the internal diameter or bore of the stock 6. A mounting washer or flange member 20 may also ride the mandrel, preferably with a keyed relation to the mandrel, as by employment of a key pin 21 radially driven into the mandrel and engageable with an axial groove 22 in the mounting flange 20. A take-up nut 23 may be threaded on the other end of the mandrel 17, as on the rear end shown.

It will be appreciated that, upon threaded advance of the nut 23 onto the mandrel 17, the ring 19 may be axially compressed for a radially stressed engagement with the stock 6. For a better distribution of squeezing forces, I prefer that washer means 24—25 shall be employed on opposite sides of the ring 19, and the washer means 24—25 are preferably keyed to the mandrel 17. In the form shown, this keying is accomplished by means of an axial pin 26 between the flange 18 and the washer 25 and by means of an axial pin 27 between the mounting flange 20 and the washer 24.

It will be seen that the outer exposed surface of the mounting flange 20 may be substantially flat and in a radial plane. Against this flat surface, I provide means for the selective eccentric adjustable securing of an adapter means 28 to be secured to the stock-pusher head 29. The adjustable eccentric securing may be achieved by means of a plurality of bolts 30 in engagement with tapped holes 31 in the mounting flange 20. The bolts 30 may span a flange portion 32 of adapter means 28, and where they span this flange portion 32 the shanks of the bolt 30 are preferably radially loosely accommodated, as in openings or mounting bores 33. In the form shown, it will be clear that the adapter 28 may be eccentrically mounted with respect to the mandrel 17 over a range of eccentric adjustments varying from the one extreme shown, wherein the adapter axis is eccentrically displaced above the mandrel axis (in the sense of the drawings), to a corresponding position below the mandrel axis. It will further be clear that by employment of circular or otherwise enlarged openings 33, this range of eccentric adjustment may be permitted in angular planes other than the particular cross-sectional plane shown.

Various means may be employed for the removable securing of the adapter means 28 to the pusher head 29. In the form shown, I employ a quick-release engagement, as may be effected between a single pin 35 extending along one diameter through the adapter 28 and projecting radially out both sides of the adapter 28. The pin 35 may engage diametrically opposed helical slots 36 in the nose of the pusher head 29, and, upon propulsion of pin 35 in slots 36, a conical nose 37 on the adapter 28 may be driven into firm locating engagement with a corresponding conical seat 38 within the pusher nose.

In use, my chucking assembly and my adapter assembly may be separate from each other and separate from the pusher head 29. In application to a piece of stock to be fed, the chucking means should be inserted into axial overlap with the tail end of the stock, and in the case of tubular stock shown the ring 19 should be inserted in the bore of the stock. Such insertion may be made until the mounting flange 20 abuts the tail end of the stock, at which time the nut 23 and mounting flange 20 may be relatively rotated in order to effect chucking. The adapter member 28 may then be placed over the end of the chucking mechanism, and the securing bolts 30 longitudinally threaded into the tapped holes 31 of the mounting plate 20. Next, the nose 37 of the adapter 28 may be introduced in the seat 38 of the pusher 29, and a rotation of the pin 35 may drive the nose 37 into firm seating engagement and thus into coaxial alignment with the pusher. In setting the chucking means it may be that some eccentricity was introduced between the mandrel axis and the stock axis. This eccentricity may be effectively nullified upon proper eccentric placement of the mandrel 17 with respect to the adapter 28, and the eccentric adjustment may be secured when bolts 30 are set.

In Figs. 2, 3, and 4 I show a modified stock-chucking means wherein provision is made for effectively nullifying either or both axially-angular misalignment and eccentric offset resulting from chucking the pusher mechanism to the stock; by axially-angular misalignment, I mean an angular relative displacement between two axes. As in the case of the other described arrangement, the chucking means may include a stud or mandrel 40 having an enlarged head 41 at the inner end thereof, and an annular ring 42 of resilient material may be fitted over the stud 40 for compression between washer members 43—44. In an unstressed state, the resilient ring 42 preferably just clears the bore of the stock 45 so that, when compressed, there may be a firm grip on the bore. Compression may be achieved by means of an axial bolt 46 seated upon a bridge member 47, which may bear upon a flange member 48. The bore 49 of the flange member 48 is preferably larger than the mandrel diameter so that an eccentric or radially offset adjustment may be made when securing the flange member 48. The flange member 48 may be broached, as at 50, to provide a key slot for angular locking engagement with a key or pin 51 carried in the mandrel.

The adapter member 52 for engagement with the stock-pushing head, which may be the pusher head 29 of Fig. 1, may again include a generally conical outer end 53 to be received in the seat 38 (Fig. 1). The adapter member 52 may include a flanged portion 54 with a plurality of angularly spaced longitudinally extending holes 55 to accommodate securing bolts 56, seated upon the flange 54 and threadedly engaged to the chuck flange 48. For adjustment purposes, the holes 55 are preferably larger than necessary to accommodate the securing bolts 56, as will be understood. In order to permit adjustment for angular misalignment, the adapter member 52 may be formed with a seating part 57 which may have a spherical surface 58 mating with a correspondingly spherically formed surface on the member 52. The adapter member 52 is preferably bored, as at 59, for its longitudinal length so as to permit tool access via the bore 59 to the bolt 46, in order that eccentric adjustment may be made after the adapter 52 has been secured to the chuck flange 48.

In fitting the described parts, I prefer first to establish a seating of the chuck member on the tail end of the stock. This seating may be perfectly axially aligned, that is, the chuck mandrel 40 may be concentric with the stock axis. However, it may occur that the mandrel axis is not only angularly misaligned with respect to the stock axis but is also eccentric therewith. At any rate, I prefer first to tighten the bolt 46 so as to set the chuck with the face of flange 48 in firm abutment with the end of the stock.

In order then to achieve axial alignment or at least a parallel relation between the axis of the adapter 52 and the axis of the stock 45, I may employ an alignment tool 60 having longitudinally spaced feet 61—62 to rest upon the outside of the stock and including a body or yoke 63 extending around the stock to permit clamping as by means of a set screw 64 to the stock. At the rear end of the body 60, this tool may support a radially extending adjustable member 65, adjustably radially guided therein and securable as by means of a bolt 66. The adjustable member 65 may be conically formed at 67, so as to receive the conical end 53 of the adapter member 52.

In using the alignment tool, the bolt 66 should be slightly loosened so as to permit radial sliding freedom to the adjustable member 65, and the conical end 53 should be fitted therein. The securing bolts 56 should be slackened to permit freedom for angular and eccentric movement of the adapter member 52 with respect to the stock, and then the set screw 64 may be set to clamp the tool in place. With a knowledge of stock diameter, it will be possible to read, as by means of a mark 68 against a scale 69 inscribed on the adjustable member 65, whether or not the adapter member 52 is concentrically aligned with the stock axis. If not aligned, the bolts 56 or the bolt may be slackened to permit eccentric displacement of the flange member 48, and, upon sufficient eccentric displacement, as read against the scale 69, a proper concentric alignment may be achieved. The bolts 46 and 56 may then be secured, and the adapter member 52 will be known to have assumed a correct alignment. In Fig. 4, I show the appearance of the parts in a slightly exaggerated arrangement wherein the adjustment in securing the adapter at 52 in place has involved both angular and eccentric misalignments.

It will be clear that I have described relatively simple means for chucking a pusher head to a piece of stock. My improved chucking means may incorporate novel eccentrically adjustable and angularly adjustable means, whereby any eccentricity or other misalignment introduced upon or noted after chucking may be effectively nullified so that an entire rotating mass including the stock and the pusher may rotate with minimum eccentric gyration.

It will be appreciated that such eccentric or other adjustment as is permitted by my construction may be particularly important and effective in machines accommodating large-diameter stock and in machines rotating at high speed. Whatever the size of stock, it will be appreciated that the principles of my invention may be utilized without impairing the ability of the stock-feeding mechanism to enter fully into the spindle and (as in the case shown) all the way up to the collet jaws themselves, whereby the stock may be consumed to the fullest extent and with minimum waste.

While I have described my invention in detail for the preferred forms shown, it will be understood that modifications may be made within the scope of the invention as defined in the appended claims.

I claim:

1. In a device of the character indicated for use in a stock-feeding mechanism, chucking means including a cylindrical mandrel with a radial flange at one end, a resilient annular ring on said mandrel, a mounting flange on said mandrel, and a take-up nut threaded on the other end of said mandrel, whereby upon insertion of said resilient ring into the bore of tubular stock a take-up of said nut on said mandrel may effectively expand said ring into tight gripping relation with said stock, said mounting flange having a plurality of threaded mounting holes, an adapter member abutting said flange and having means for attachment to a pusher head, said adapter member and said mounting flange having relatively radially slidable abutting surfaces in a common radial plane, whereby a degree of relatively eccentric adjustment is permitted to said mandrel and said adapter means, said adapter member having mounting openings in general alignment with the threaded holes in said mounting flange, and securing bolts longitudinally directed through said openings and in threaded engagement with said holes, said bolts being accommodated radially loosely in said openings, whereby said bolts may secure a selected degree of eccentric displacement of said adapter member relatively to said mandrel.

2. As an article of manufacture for use in a stock-feeding mechanism of the character indicated, a mandrel with enlarged abutment means at one end thereof, a ring of expandable resilient material on said mandrel and retained by said abutment means, said ring and said abutment means being slightly under the bore diameter to be chucked, an abutment-plate member slidably carried on said mandrel and having a flat abutment surface of diametral extent exceeding the bore diameter to be chucked, whereby said surface may directly abut the end of a chucked piece of tubular stock, chuck-actuating means comprising means threadedly carried at the other end of said mandrel and in axial abutment with said abutment-plate member, whereby upon take-up of said threaded means said ring will be expanded and said abutment-plate member will be drawn axially into firm abutment with the end of the stock, an adapter member eccentrically adjustably carried by said abutment-plate member, and securing means comprising an angularly spaced plurality of threaded elements threaded into said abutment-plate member and having limited angular and radial freedom with respect to said adapter member.

3. An article according to claim 2 in which said adapter member and said abutment-plate member abut at plane radial surfaces.

4. An article according to claim 2, in which said adapter member includes a circumferentially extending spherical surface centered on the adapter axis, for angularly eccentric adjustment of said adapter member relatively to said mandrel.

5. An article according to claim 2, in which one of said members includes a flat radial eccentric-adjustment surface and the other includes a spherical eccentric-adjustment surface, and an adapter ring intermediate said surfaces and having flat and spherical surfaces for adjustable abutment with the corresponding surfaces of said adapter member and said abutment-plate member.

6. An article according to claim 2, in which key means are provided between said mandrel and said abutment-plate member.

WILLIAM B. RETZ.

REFERENCES CITED

The following references are of record in the file of this patent:

UNITED STATES PATENTS

| Number | Name | Date |
|---|---|---|
| 2,327,897 | Howard | Aug. 24, 1943 |
| 2,426,200 | Green | Aug. 26, 1947 |
| 2,469,198 | La Pointe | May 3, 1949 |